Patented July 10, 1923.

1,461,435

UNITED STATES PATENT OFFICE.

HERMANN STAUDINGER, OF ZURICH, HANS VERAGUTH AND RICHARD TOBLER, OF BASEL, SWITZERLAND, ASSIGNORS TO SOCIETY OF CHEMICAL INDUSTRY IN BASLE, OF BASEL, SWITZERLAND.

INDIGOIDIC DYESTUFFS AND PROCESS OF MAKING SAME.

No Drawing. Application filed November 11, 1922. Serial No. 600,405.

*To all whom it may concern:*

Be it known that we, HERMANN STAUDINGER, of Zurich, Switzerland, HANS VERAGUTH, of Basel, Switzerland, and RICHARD TOBLER, of Basel, Switzerland, all three citizens of the Republic of Switzerland, have invented new and useful Indigoidic Dyestuffs and a Process of Making Same, of which the following is a full, clear, and exact specification.

We have found that very valuable indigoidic dyestuffs can be obtained if the beta-thionaphthisatine having the fusion point of 153° and which can be obtained for example by the reaction of oxalylchloride upon beta-thionaphthol is caused to react upon cyclic compounds which carry methylene groups capable of reacting, such as indoxyls, thioindoxyls, pyrazolones, acenaphthenone, alpha-oxyanthracene, alpha-naphthol and their derivatives and products of substitution. In this way, we obtain indigoidic dyestuffs which are characterized by the following atom grouping showing two symmetrical members

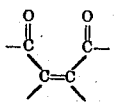

the first member of which is coupled to the 1-position and to the sulfur atom of the beta-thionaphthol radical, whilst its second member belongs to any cyclic complex. These dyestuffs constitute dark powders, which dissolve in sulfuric acid of 98 per cent with brown-violet to blue-green and olive coloration. With hydrosulfite and soda lye there are obtained orange-yellow to olive-green vat liquors which dye wool and cotton of solid red to brown and blue-black tints. A halogenizing operation converts these dyestuffs into more solid products.

The following examples illustrate our invention without limiting the scope thereof.

*Example 1.*

214 parts of beta-thionaphthisatine are mixed with 150 parts of oxythionaphthene and the whole is introduced, while stirring and cooling, into 2000 parts of sulfuric acid. Thereupon, we add slowly and while further cooling down, 2000 parts of glacial acetic acid and pour after some time the dark green solution on ice. The coloring matter separates in the form of red flocks which are filtered, washed and dried. It constitutes a red powder, dissolves in hot nitrobenzene with red and in concentrated sulfuric acid with dark blue-green coloration. With hydrosulfite and soda lye, it gives a yellow vat liquor which dyes wool of red tints fast to light and fulling and which dyes cotton of Bordeaux-red tints of great fastness to light, washing and chlorine. By bromination, for example when treating 34.6 parts of this dyestuff in 270 parts of nitrobenzene with 60 parts of a solution of 25 per cent of bromine in nitrobenzene, we obtain a coloring matter of substantially bluer shade.

If we replace in this example the oxy-thionaphthene by other compounds with a methylene group capable of reacting, such as products of substitution of the oxy-thionaphthene, for example 6 chlorooxy-thionaphthene, further indoxyl, acenaphthenon, alpha-naphthol and its products of substitution, alpha-oxyanthracene, phenyl-methylpyrazolone, we obtain also vat dyestuffs; thus, we obtain for example with indoxyl a violet dyestuff, with acenaphthenone and phenylmethylpyrazolone brown dyestuffs and with chlorinated alpha-naphthols, dioxynaphthalines and alpha-oxyanthracene grey dyestuffs.

*Example 2.*

Into 7000 parts of alcohol we introduce 214 parts of beta-thionaphthisatine and 209 parts of 6-aminothioindoxylcarbonic acid and the whole is then boiled for some hours on the return-flow cooler. The condensation can be accelerated by addition of some ammonia or dimethylaniline. The condensation being achieved, the product is filtered, washed and dried. The coloring matter thus obtained constitutes a dark powder which dissolves in sulfuric acid of 98 per cent with blue coloration. With hydrosulfite and soda lye, we obtain an orange-yellow vat liquor which dyes wool and cotton of fast red-brown or yellow-brown tints.

361 parts of this dystuff are dissolved at a temperature of 0° to 5° C. in 9000 parts of sulfuric acid of 98 per cent and mixed with 144 parts of bromine. We stir up for some hours while cooling; then the temperature is allowed to rise to 20° C. and the mass is further stirred during 14 hours. Thereupon, the same is poured on ice, the separated coloring matter is filtered and dried. It shows, besides its substantially raised fastness to chlorine, similar tinctorial properties to that of the not brominated product.

*Example 3.*

64 parts of beta-thionaphthisatine, 51 parts of acenaphthenone, 6 parts of zinc chloride are boiled for a longer time with 700 parts of chlorobenzene on the return-flow cooler. After the mass has been allowed to cool down, it is filtered and the separated product is washed successively with alcohol, with soda lye and again with alcohol and then dried. Thus, a dark powder is obtained, which dissolves in sulfuric acid of 98 per cent with brown-violet coloration and gives with hydrosulfite and soda lye an olive-green vat liquor dyeing cotton of very fast bright brown tints.

What we claim is:

1. A process for the manufacture of new vat dyestuffs, consisting in causing beta-thionaphthisatine to react upon cyclic compounds having a methlyene group capable of reacting.

2. A process for the manufacture of new vat dyestuffs, consisting in causing beta-thionaphthisatine to react upon cyclic compounds having a methylene group capable of reacting, and in halogenizing then the coloring matters thus obtained.

3. A process for the manufacture of new vat dyestuffs, consisting in causing beta-thionaphthisatine to react upon heterocyclic complexes having a methylene group capable of reacting.

4. A process for the manufacture of new vat dyestuffs, consisting in causing beta-thionaphthisatine to react upon heterocyclic complexes having a methylene group capable of reacting, and in halogenizing the coloring matters thus obtained.

5. A process for the manufacture of new vat dyestuffs, consisting in causing beta-thionaphthisatine to react upon a complex composed of a heterocyclic five atom annulus, as carrier of a methylene group capable of reacting and condensated with an aromatic radical which may carry still further substituents.

6. A process for the manufacture of new vat dyestuffs, consisting in causing beta-thionaphthisatine to react upon a complex composed of a heterocyclic five atom annulus, as carrier of a methylene group capable of reacting and condensated with an aromatic radical which may carry still further substituents, the coloring matters thus obtained being then halogenized.

7. A process for the manufacture of new vat dyestuffs, consisting in causing beta-thionaphthisatine to react upon a complex composed of an annulus of four carbon atoms and one sulfur atom, as carrier of a methylene group capable of reacting and condensated with an aromatic radical which may carry still further substituents.

8. A process for the manufacture of new vat dyestuffs, consisting in causing beta-thionaphthisatine to react upon a complex composed of an annulus of four carbon atoms and one sulfur atom, as carrier of a methylene group capable of reacting and condensated with an aromatic radical which may carry still further substituents, the coloring matters thus obtained being then halogenized.

9. A process for the manufacture of new vat dyestuffs, consisting in causing beta-thionaphthisatine to react upon a thioindoxyl complex.

10. A process for the manufacture of new vat dyestuffs, consisting in causing beta-thionaphthisatine to react upon a thioindoxyl complex, the aromatic part of which may carry sill further substituents.

11. A process for the manufacture of new vat dyestuffs, consistsing in causing beta thionaphthisatine to react upon a thioindoxyl complex, and in halogenizing then the coloring matters thus obtained.

12. A process for the manufacture of new vat dyestuffs, consisting in causing beta-thionaphthisatine to react upon a thioindoxyl complex, the aromatic part of which may carry still further substituents, and in halogenizing then the coloring matters thus obtained.

13. As new products, the herein before described vat dyestuffs from beta-thionaphthisatine and cyclic compounds having a methylene group capable of reacting, which constitute dark powders soluble in sulfuric acid of 98 per cent with brown-violet to blue-green and olive coloration, dyeing wool and cotton in the hydrosulfite vat liquor of fast red to brown and violet-black tints and having a constitution characterized by the following atom grouping with two symmetrical members

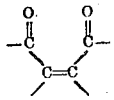

the first member of which is coupled to the 1-position and to the sulfur atom of the beta-thionaphthol radical, whilst the second member belongs to any cylic complex.

14. As new products the herein before described vat dyestuffs from beta-thionaphthisatine and cycliic compounds having a methylene group capable of reacting, which constitute dark powders soluble in sulfuric acid of 98 per cent with brown-violet to blue-green and olive coloration, dyeing wool and cotton in the hydrosulfite vat liquor of fast red to brown and violet-black tints and having a constitution characterized by the following atom grouping with two symmetrical members

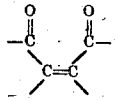

the first member of which is coupled to the 1-position and to the sulfur atom of the beta-thionaphthol radical, whilst the second member belongs to any cyclic complex, said dyestuffs being in the form of halogen compounds.

15. As new products, the hereinbefore described vat dyestuffs from beta-thionaphthisatine and heterocyclic complexes with a methylene group capable of reacting, which constitute dark powders soluble in sulfuric acid of 98 per cent with brown-violet to blue-green coloration, dyeing wool and cotton in the hydrosulfite vat liquor of fast red to brown tints and having a constitution characterized by the following atom grouping with two symmetrical members,

the first member of which is coupled to the 1-position and to the sulfur atom of the beta-thionaphthol radical, whilst the second member belongs to a heterocyclic complex, said dye-stuffs being in the form of halogen compounds.

16. As new products, the hereinbefore described vat dyestuffs from beta-thionaphthisatine and a complex composed of a heterocyclic five atom annulus as carrier of a methylene group capable of reacting and condensated with an aromatic radical which may carry still further substituents, which constitute dark powders soluble in sulfuric acid of 98 per cent with brown-violet to blue-green coloration, dyeing wool and cotton in the hydrosulfite vat liquor of fast red to brown tints and having a constitution characterized by the following atom grouping with two symmetrical members

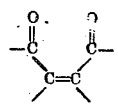

the first member of which is coupled to the 1-position and to the sulfur atom of the beta-thionaphthol radical, whilst the second member belongs to a heterocyclic five atom annulus, condensated with an aromatic radical, which may carry still further substituents, said dyestuffs being in the form of halogen compounds.

In witness whereof we have hereunto signed our names this 30th day of October, 1922, in the presence of three subscribing witnesses.

HERMANN STAUDINGER.
HANS VERAGUTH.
RICHARD TOBLER.

Witnesses:
AMAND KRANZ,
LUCIEN PICARD,
JULIA A. DURST.